(No Model.) 2 Sheets—Sheet 1.

J. J. WILLIAMS.
METHOD OF REPAIRING PNEUMATIC TIRES.

No. 503,636. Patented Aug. 22, 1893.

Witnesses:
Joseph Arthur Cantin.
Arthur B. Jenkins.

Inventor:
John J. Williams,
By Chas. L. Burdett,
Attorney.

(No Model.) 2 Sheets—Sheet 2.
J. J. WILLIAMS.
METHOD OF REPAIRING PNEUMATIC TIRES.
No. 503,636. Patented Aug. 22, 1893.
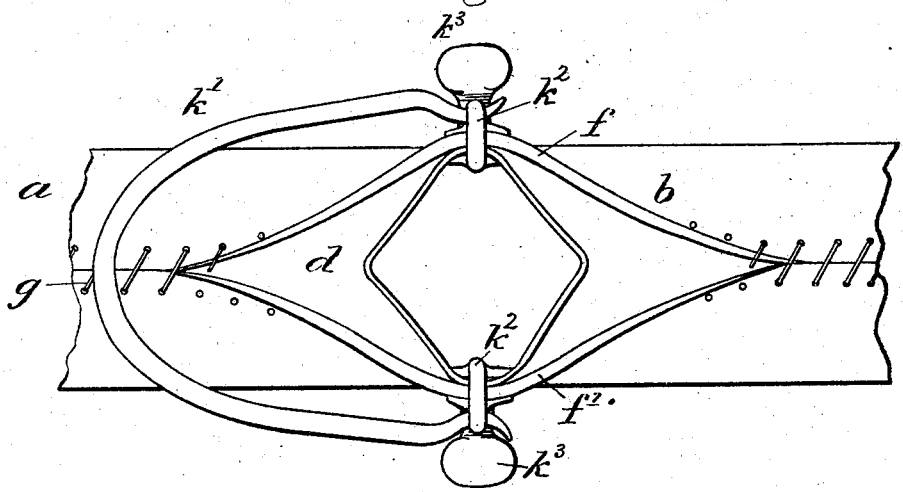
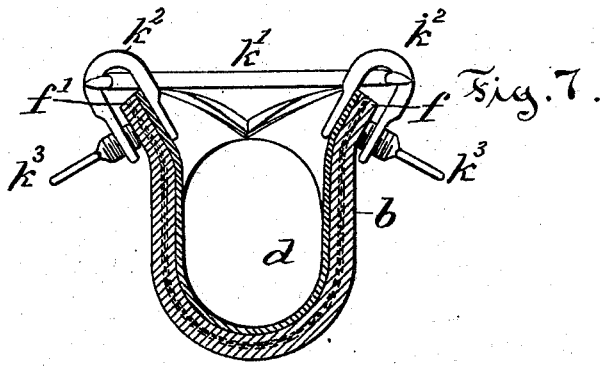

UNITED STATES PATENT OFFICE.

JOHN J. WILLIAMS, OF MONTPELIER, VERMONT.

METHOD OF REPAIRING PNEUMATIC TIRES.

SPECIFICATION forming part of Letters Patent No. 503,636, dated August 22, 1893.

Application filed May 24, 1893. Serial No. 475,326. (No specimens.)

*To all whom it may concern:*

Be it known that I, JOHN J. WILLIAMS, of Montpelier, in the county of Washington and State of Vermont, have invented certain new and useful Improvements in Methods of and Means for Repairing Pneumatic Tires, of which the following is a full, clear, and exact description, whereby any one skilled in the art can make and use the same.

In one class of pneumatic tires known as the single tube type the inner air tube, the restraining sack and the covering layer are built up and form an integral wall, the several layers being united in the process of vulcanization to which the tire is submitted.

The object of my invention is to produce a method of and means for repairing a tire of this type by providing means for giving access to the interior of the tire at any desired point along its length.

My invention consists in the method of repairing the tire that comprises the severing or separating of the outer or covering layer, forming an opening through the wall of the air tube near the point where the repair is to be made and patching the puncture or opening on the inside through the opening in the opposite wall of the inner tube; and my improvement further consists in the means which enable this method to be carried into effect and in the combination of the several parts as more particularly hereinafter described and pointed out in the claims.

Figure 1:
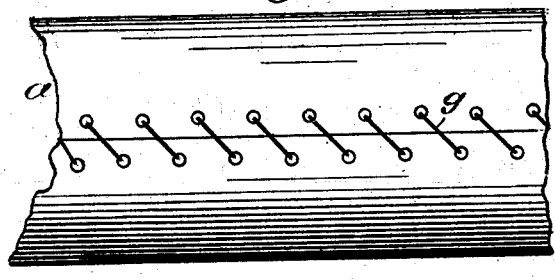
Figure 2:
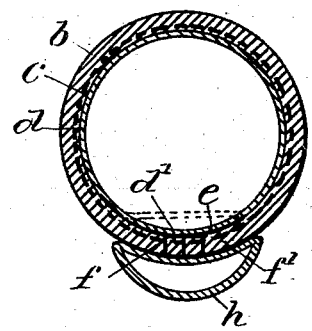
Figure 3:
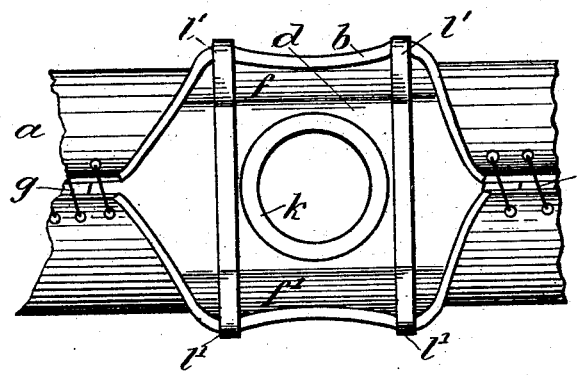
Figure 4:
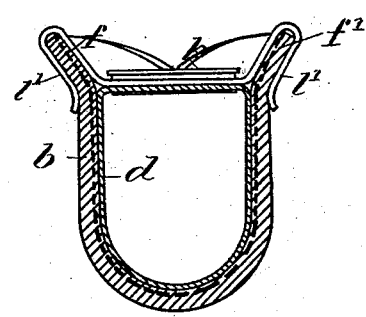
Figure 5:
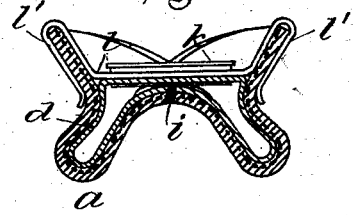

Referring to the drawings: Figure 1 is a detail plan view of a piece of a pneumatic tire showing the under side. Fig. 2 is a detail view in cross section of the tire. Fig. 3 is a detail view of a short length of the tire showing the manner of using the extending frame in getting access to the interior of the air tube. Fig. 4 is a detail view in cross section of the tire with the frame in place. Fig. 5 is a detail view in cross section of the tire showing the manner of raising the punctured portion of the air tube so as to enable a patch to be applied to the inside of that tube. Fig. 6 is a detail plan view of a short length of a pneumatic tire showing the manner of distending the flaps by means of a brace and clamps. Fig. 7 is a detail view in cross section of the tire shown in Fig. 6 and showing the brace in use.

In the accompanying drawings the letter $a$ denotes a pneumatic tire having its wall built up of several layers of which $b$ denotes the covering layer, $c$ the restraining sack which consists of a layer of textile fabric molded within the structure, and $d$ denotes the air tube, these several parts being usually molded together in the process of manufacture and then vulcanized to form the tire, the wall of which is practically integral in such tires as ordinarily made. In the practice of my invention the inner tube, however, is separated from the next outer layer along one side and for a limited part of its width, as shown at $e$, and the outer covering layer is slitted lengthwise along this portion so that flaps $f, f'$, are formed which may be readily opened apart so as to uncover and expose that portion $d'$ of the inner tube which has been left separate from its next outer layer. These flaps may be provided with eyelets or other devices for the attachment of a lacing $g$ used for securing the edges of the flaps together.

In case a tire of the single tube type is punctured it is removed from the rim $h$ by deflating it and then rolling it out of its seat and when thus deflated the flaps may be unlaced for a sufficient distance to uncover the inner tube on the side opposite to that in which the puncture $i$ may be located. If the tire is one in which the walls are integral it may be necessary to cut through the outer layer for a sufficient distance lengthwise along the tire to enable this outer layer to be stripped back and off from the inner tube and a slit is then cut through the wall of the inner tube directly over the place of puncture in the tire or as near it as may be practical.

In order to give access to the puncture an extending frame $k$ of any suitable form, but preferably circular, may be thrust into the slit made in the wall of the inner tube and the flaps are held extended by means of braces $l$ the ends of which are provided with any suitable means of attachment to the flaps, as the clips $l'$ formed by bending back the ends of the braces; or a brace may be used to hold the slit open and the flaps extended.

In place of the frame a brace $k'$ may be used, the edges of the flaps and of the inner tube where it is slitted being grasped by clamps $k^2$. Each clamp $k^2$ bears a clamp screw $k^3$ adapted to bind upon the edge of a flap and one side of the slit in the inner tube, a loop on the clamp serving to receive the end of the curved brace which is preferably bowed and of spring metal so that each end may be attached to a clamp and thus serve to hold the parts distended to give access to the interior of the tube. The tire is then manipulated so as to bring the punctured part opposite to the slit in the tube and as near to it as will enable suitable access to be had for the application of a patch $i$ that may be secured in place as by means of rubber cement, or for the making of such other repairs as may be necessary. As soon as the puncture is suitably patched the frame $k$, if used, is removed and the slit through the inner tube, made for the purpose of inserting the frame, is closed and a patch of a suitable size used to mend the slit. The braces are then removed and the edges of the covering layer brought together and united by a suitable means, as lacings, or by means of cement and patches applied to the outer surface. As soon as the cement used in applying the several patches has dried the tire may be placed in its seat in the rim and inflated.

By means of the within described method and the devices described a pneumatic tire of the single tube type described may be readily repaired in a comparatively short time.

I claim as my invention—

1. The method of repairing a pneumatic tire of the single tube type which consists in separating the outer covering layer along the inner surface of the tire, opening out the flaps and uncovering the wall of the inner tube, making an opening through the wall of the inner tube and applying a patch to the inner surface of the air tube at a point where the puncture or place of leakage is located, all substantially as described.

2. The method of repairing a pneumatic tire of the single tube type which consists in separating the covering layer along the inner surface of the tire, holding the separated edges of the covering layer apart as by means of braces, making an opening through the wall of the inner tube and distending the opening by means of a frame inserted therein, and then applying a patch to the interior of the tube at the point of puncture, all substantially as described.

3. The means of repairing a pneumatic tire which comprise an extending frame adapted to be inserted in a slit in the wall of the tube and braces adapted to hold the edges of the covering layer apart and provided with means for attachment to the opposite edges of the covering layer, all substantially as described.

4. The means of repairing a pneumatic tire which comprise clamps having means for attachment to the edges of the opening in the tubular tire and the brace operating to hold the edges of the opening distended, all substantially as described.

5. The method of repairing pneumatic tires which consists in deflating the tire so as to remove it from the rim of a wheel, then dividing or severing the outer covering or tread which surrounds the inner air-tube at a point opposite the point desired to be repaired in said inner air-tube, cutting or slitting said inner air-tube a slight distance at a point or place opposite the point to be repaired and pressing the point to be repaired up so that its inner side shall be accessible through the severed portions of said inner tube and outer covering and then repairing the desired portion.

6. The method of repairing pneumatic tires which consists in deflating the tire so as to remove it from the rim, then severing or slitting the outer covering or tread which surrounds the inner tube at a point opposite the point or place in the inner tube which is desired to be repaired, severing or slitting said inner air-tube at a point or place opposite to the point or place in said tube which is to be repaired and holding said severed or slit portions open, then forcing the point or place to be repaired up so that its under side shall be accessible through the severed or slit portions of said inner tube and outer covering and making the necessary repairs thereto.

JOHN J. WILLIAMS.

Witnesses:
GEORGE E. WHITE,
WALLACE E. DUFER.